United States Patent
Wong

(10) Patent No.: US 10,652,923 B2
(45) Date of Patent: May 12, 2020

(54) METHOD FOR INDICATING THE ALLOCATED RESOURCES FOR A HARQ MESSAGE IN A RANDOM ACCESS PROCEDURE FOR A LOW-COMPLEXITY, NARROWBAND TERMINAL

(71) Applicant: SONY CORPORATION, Tokyo (JP)

(72) Inventor: Shin Horng Wong, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 136 days.

(21) Appl. No.: 15/751,313

(22) PCT Filed: Sep. 22, 2016

(86) PCT No.: PCT/EP2016/072506
§ 371 (c)(1),
(2) Date: Feb. 8, 2018

(87) PCT Pub. No.: WO2017/050868
PCT Pub. Date: Mar. 30, 2017

(65) Prior Publication Data
US 2018/0235003 A1 Aug. 16, 2018

(30) Foreign Application Priority Data
Sep. 25, 2015 (EP) .................................... 15186962

(51) Int. Cl.
*H04W 74/00* (2009.01)
*H04L 1/18* (2006.01)
(Continued)

(52) U.S. Cl.
CPC ......... *H04W 74/008* (2013.01); *H04L 1/1671* (2013.01); *H04L 1/1861* (2013.01);
(Continued)

(58) Field of Classification Search
None
See application file for complete search history.

(56) References Cited

U.S. PATENT DOCUMENTS

| 2007/0206531 A1 | 9/2007 | Pajukoski et al. |
| 2018/0263061 A1* | 9/2018 | Moroga ................ H04W 72/04 |
| 2019/0253225 A1* | 8/2019 | Park ....................... H04L 1/1812 |

FOREIGN PATENT DOCUMENTS

| WO | 2007/083230 A2 | 7/2007 |
| WO | 2007/083230 A3 | 7/2007 |

OTHER PUBLICATIONS

LTE Advanced, 3rd Generation Partnership Project; Technical Specification Group Services and System Aspects; Service requirements for Machine-Type Communications (MTC); Stage 1 (Release 13); 3GPP TS 22.368 V13.1.0 (Dec. 2014), Total 26 pages.

(Continued)

*Primary Examiner* — Rebecca E Song
(74) *Attorney, Agent, or Firm* — Xsensus LLP

(57) ABSTRACT

A method of transmitting an acknowledgment message in a random access procedure in a mobile telecommunications system, the method including: transmitting an uplink random access request; responsive to the random access request, transmitting a downlink allocation message indicating downlink resources for sending a downlink message; transmitting the downlink message using the resources indicated in the downlink allocation message; responsive to receiving the downlink message, transmitting an uplink message; and transmitting an acknowledgement message in respect of the uplink message and using one or more acknowledgment resources, wherein the one or more acknowledgment resources are identified based on at least one of the downlink allocation message, the downlink message and the uplink random access request.

17 Claims, 6 Drawing Sheets

(51) Int. Cl.
  *H04L 5/00* (2006.01)
  *H04W 72/04* (2009.01)
  *H04L 1/16* (2006.01)
(52) U.S. Cl.
  CPC .......... *H04L 1/1864* (2013.01); *H04L 1/1887* (2013.01); *H04L 5/0053* (2013.01); *H04L 5/0055* (2013.01); *H04L 5/0094* (2013.01); *H04W 72/042* (2013.01); *H04W 72/0406* (2013.01); *H04W 72/0453* (2013.01)

(56) References Cited

OTHER PUBLICATIONS

Holma, et al., "LTE for UMTS OFDMA and SC-FDMA based radio access", Wiley and Sons, 2009, Total 4 pages.
Ericsson, "Random access for Rel-13 low complexity and enhanced coverage UEs", 3GPP TSG-RAN WG2 #91, Tdoc R2-153717, Aug. 24-28, 2015, Total 7 pages.
Toskala, et al., "Physical Layer", LTE for UMTS-OFDMA and SC-FDMA Based Radio Access, 2009, Total 53 pages.
International Search Report dated Dec. 8, 2016 in PCT/EP2016/072506 filed Sep. 22, 2016.

* cited by examiner

METHOD FOR INDICATING THE ALLOCATED RESOURCES FOR A HARQ MESSAGE IN A RANDOM ACCESS PROCEDURE FOR A LOW-COMPLEXITY, NARROWBAND TERMINAL

CROSS-REFERENCE TO RELATED APPLICATIONS

The present application is based on PCT filing PCT/EP2016/072506 filed Sep. 22, 2016, and claims priority to European Patent Application 15 186 962.5, filed in the European Patent Office on 25 Sep. 2015, the entire contents of each of which being incorporated herein by reference.

FIELD

The present disclosure relates to telecommunications apparatuses and methods.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) and Long Term Evolution Advanced (LTE-A) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis. Examples include so-called smart meters which, for example, are located in a customers home and periodically transmit data back to a central MTC server relating to the customers consumption of a utility such as gas, water, electricity and so on. Smart metering is merely one example of potential MTC device applications. Further information on characteristics of MTC-type devices can be found, for example, in the corresponding standards, such as 3GPP TS 22.368 version 13.1.0 Release 13 (2014-12) [1].

Whilst it can be convenient for a terminal such as an MTC-type terminal to take advantage of the wide coverage area provided by a third or fourth generation mobile telecommunication network there are at present disadvantages. Unlike a conventional third or fourth generation mobile terminal such as a smartphone, a primary driver for MTC-type terminals will be a desire for such terminals to be relatively simple and inexpensive. The type of functions typically performed by an MTC-type terminal (e.g. simple collection and reporting/reception of relatively small amounts of data) do not require particularly complex processing to perform, for example, compared to a smartphone supporting video streaming. However, third and fourth generation mobile telecommunication networks typically employ advanced data modulation techniques and support wide bandwidth usage on the radio interface which can require more complex and expensive radio transceivers and decoders to implement. It is usually justified to include such complex elements in a smartphone as a smartphone will typically require a powerful processor to perform typical smartphone type functions. However, as indicated above, there is now a desire to use relatively inexpensive and less complex devices which are nonetheless able to communicate using LTE-type networks.

Amongst the techniques proposed to reduce the complexity, cost and power consumption of such devices, a first one is the restriction of the frequency band that the devices operate on. Currently, it has been proposed that a Low Complexity ("LC") terminal would operate in a bandwidth of no more than 6 Physical Resource Blocks "PRBs". In LTE, 6 PRBs correspond to bandwidth of 1.4 MHz. When a limited bandwidth is provided for a terminal with limited capabilities to operate on is provided, it is often referred to as a "narrowband". The bandwidth of the telecommunication system can therefore be divided into multiple 6 PRBs narrowbands and an LC-MTC terminal is expected to be able to tune into any of these narrowbands.

Another technique to increase coverage for MTC and LC-MTC devices is the use of repetitions. In this Coverage Enhancement (CE) feature, the coverage for LC-MTC can be extended by up to 15 dB (relative to that of Cat-1 terminal) by repeating the symbols or messages transmitted to the LC-MTC. Using numerous repetitions of the same information, the coverage provided by the base station can be extended.

While the narrowband technique enables a simplification of the terminal by reducing the operative bandwidth, thereby reducing costs, complexity and power consumption, integrating narrowband terminals in a legacy system that has been conceived and designed with full-bandwidth terminals in mind can be challenging and it can prove difficult for a LC terminal to operate normally when it is not able to receive signals across the entire bandwidth of the system. In particular a terminal becomes limited in the bandwidth it can receive at a point in time such that some of the exiting arrangements and techniques are not available to such a terminal.

SUMMARY

According to a first example aspect, there is provided a method of transmitting an acknowledgment message in a random access procedure in a mobile telecommunications system. The method comprises transmitting an uplink random access request; responsive to the random access request, transmitting a downlink allocation message indicating downlink resources for sending a downlink message; transmitting the downlink message using the resources indicated in the downlink allocation message; responsive to receiving the downlink message, transmitting an uplink message; and transmitting an acknowledgement message in respect of the uplink message and using one or more acknowledgment resources, wherein the one or more acknowledgment resources are identified based on at least one of the downlink allocation message, the downlink message and the uplink random access request.

According to a second example aspect, there is provided a mobile telecommunications system for transmitting an acknowledgment message in a random access procedure. The mobile telecommunications system comprises a mobile node and a terminal and is configured to: transmit an uplink random access request from the terminal to the mobile node; responsive to the random access request, transmit from the mobile node to the terminal a downlink allocation message indicating downlink resources for sending a downlink message; transmitting from the mobile node to the terminal the downlink message using the resources indicated in the downlink allocation message; responsive to receiving the downlink message, transmit an uplink message from the terminal to the mobile node; and transmitting from the mobile node to the terminal an acknowledgement message in respect of the uplink message and using one or more acknowledgment resources, wherein the one or more acknowledgment resources are identified based on at least one of the downlink allocation message, the downlink message and the uplink random access request.

According to a third example aspect, there is provided a method of operating a terminal for receiving an acknowledgement message in a random access procedure in a mobile telecommunications system. The method comprises transmitting an uplink random access request; receiving a downlink allocation message in response to the uplink random access request and indicating downlink resources for sending a downlink message; receiving the downlink message using the resources indicated in the downlink allocation message; responsive to receiving the downlink message, transmitting an uplink message via the transmitter; and receiving, via the receiver, an acknowledgement message in respect of the uplink message and using one or more acknowledgment resources, wherein the one or more acknowledgment resources are identified based on at least one of the downlink allocation message and the downlink message.

According to a fourth example aspect, there is provided a terminal for receiving an acknowledgement message in a random access procedure in a mobile telecommunications system. The terminal comprises a transmitter, a receiver and a controller, the controller being configured to: transmit, via the transmitter, an uplink random access request; receive, via the receiver, a downlink allocation message in response to the uplink random access request and indicating downlink resources for sending a downlink message; receive, via the receiver, the downlink message using the resources indicated in the downlink allocation message; responsive to receiving the downlink message, transmit an uplink message via the transmitter; and receive, via the receiver, an acknowledgement message in respect of the uplink message and using one or more acknowledgment resources, wherein the one or more acknowledgment resources are identified based on at least one of the downlink allocation message and the downlink message.

According to a fifth example aspect, there is provided Integrated circuitry for a terminal for receiving an acknowledgement message in a random access procedure in a mobile telecommunications system. The integrated circuitry comprises a controller element and a transceiver element configured to operate together to: transmit, via the transceiver element, an uplink random access request; receive, via the transceiver element, a downlink allocation message in response to the uplink random access request and indicating downlink resources for sending a downlink message; receive, via the transceiver element, the downlink message using the resources indicated in the downlink allocation message; responsive to receiving the downlink message, transmit an uplink message via the transceiver element; and receive, via the transceiver element, an acknowledgement message in respect of the uplink message and using one or more acknowledgment resources, wherein the one or more acknowledgment resources are identified based on at least one of the downlink allocation message and the downlink message.

According to a sixth example aspect, there is provided a method of operating a mobile node for transmitting an acknowledgement message in a random access procedure in a mobile telecommunications system, the method comprising: receiving, via the receiver, an uplink random access request transmit, responsive to the random access request and via the transmitter, a downlink allocation message indicating downlink resources for sending a downlink message; transmit, via the transmitter, the downlink message using the resources indicated in the downlink allocation message; receive, via the receiver, an uplink signal for an uplink message; and transmit, via the transmitter, an acknowledgement message in respect of the uplink message and using one or more acknowledgment resources, wherein the one or more acknowledgment resources are identified based on at least one of the downlink allocation message and the downlink message.

According to a seventh example aspect, there is provided a mobile node for transmitting an acknowledgement message in a random access procedure in a mobile telecommunications system, the mobile node comprising a transmitter, a receiver and a controller, the controller being configured to: receive, via the receiver, an uplink random access request transmit, responsive to the random access request and via the transmitter, a downlink allocation message indicating downlink resources for sending a downlink message; transmit, via the transmitter, the downlink message using the resources indicated in the downlink allocation message; receive, via the receiver, an uplink signal for an uplink message; and transmit, via the transmitter, an acknowledgement message in respect of the uplink message and using one or more acknowledgment resources, wherein the one or more acknowledgment resources are identified based on at least one of the downlink allocation message and the downlink message.

According to a eighth example aspect, there is provided Integrated circuitry for a mobile node for transmitting an acknowledgement message in a random access procedure in a mobile telecommunications system, wherein the integrated circuitry comprises a controller element and a transceiver element configured to operate together to: receive, via the transceiver element, an uplink random access request transmit, responsive to the random access request and via the transceiver element, a downlink allocation message indicating downlink resources for sending a downlink message; transmit, via the transceiver element, the downlink message using the resources indicated in the downlink allocation message; receive, via the transceiver element, an uplink signal for an uplink message; and transmit, via the transceiver element, an acknowledgement message in respect of the uplink message and using one or more acknowledgment resources, wherein the one or more acknowledgment resources are identified based on at least one of the downlink allocation message and the downlink message.

According to a ninth and a tenth example aspect, there is provided a computer software which, when executed by a computer, causes the computer to perform any of the methods discussed above and a storage medium which stores the computer software, respectively.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
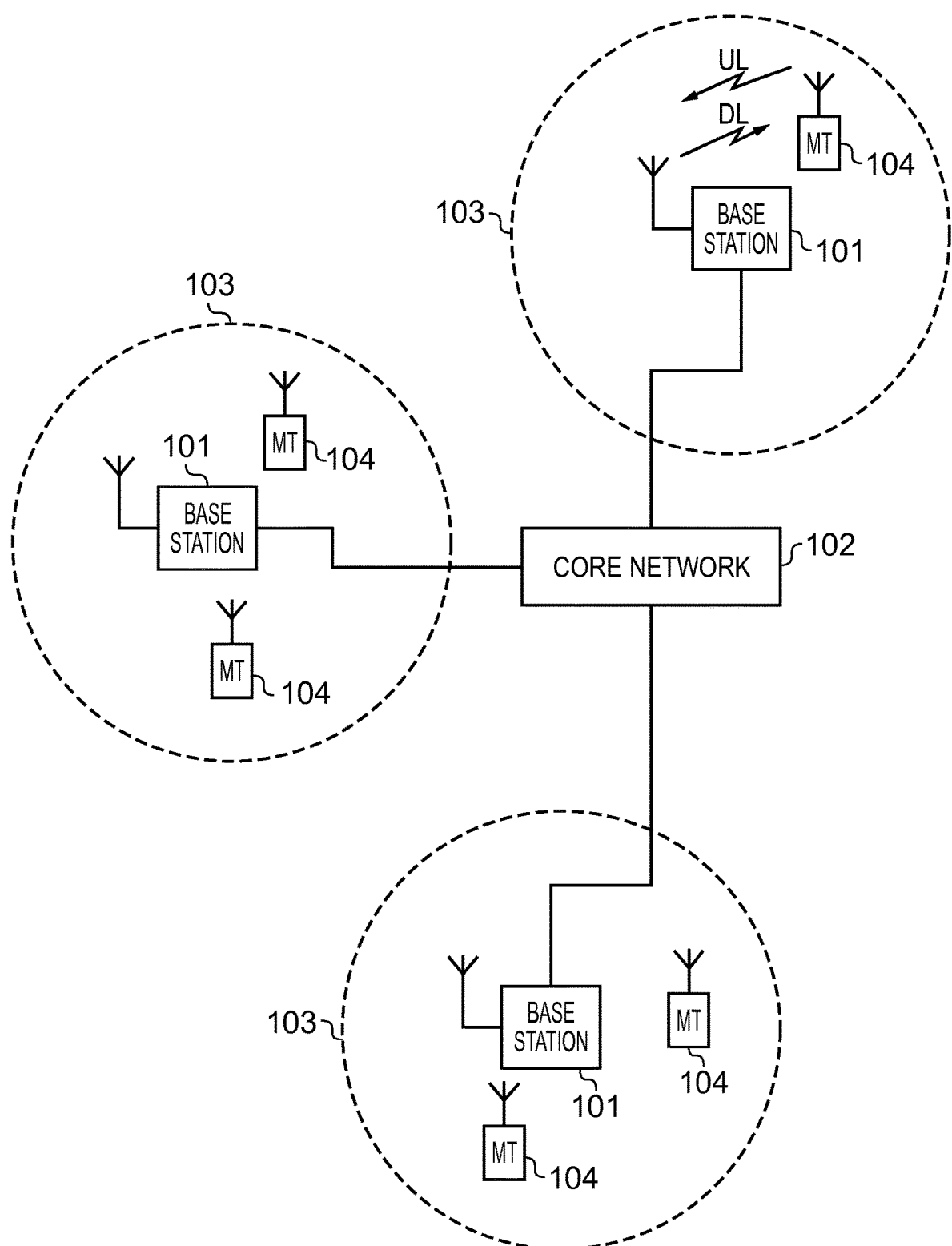
FIG. 1 provides a schematic diagram illustrating an example of a mobile telecommunication system.

FIG. 1 provides a schematic diagram illustrating some basic functionality of a mobile (cellular) telecommunications network/system 100, in this example operating generally in accordance with LTE principles, and which may be adapted to implement embodiments of the disclosure as described further below. Various elements of FIG. 1 and their respective modes of operation are well-known and defined in the relevant standards administered by the 3GPP® body, and also described in many books on the subject, for example, Holma, H. and Toskala, A. [2]. It will be appreciated that operational aspects of the telecommunications network which are not specifically described below may be implemented in accordance with any known techniques, for example according to the relevant standards and known variations thereof. Furthermore, it will be appreciated that whilst some specific examples described herein may refer to implementations based around particular 3GPP implementations, the same principles can be applied regardless of the underlying operating principles of the network. That is to say, the same principles can be applied for wireless telecommunications networks operating in accordance with other standards, whether past, current or yet to be specified.

The network includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that may be used by the operator of the network. The core network 102 routes data to and from the terminal devices 104 via the respective base stations 101 and provides functions such as authentication, mobility management, charging and so on. In addition to the base stations 101 and terminal devices 104, the system may further comprise one or more relay nodes/devices. These may be used to enhance coverage for terminal devices operating in the relevant cell(s). The deployment of relay nodes (e.g. in terms of their locations) may follow generally established techniques for using relay nodes to support coverage in wireless telecommunications systems. In terms of terminology, it will be appreciated that terminal devices may also be referred to as mobile stations, user equipment (UE), user terminal, mobile radio, mobile terminal, mobile device and so forth. Similarly, base stations may also be referred to as transceiver stations/nodeBs/e-nodeBs, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

Figure 2:
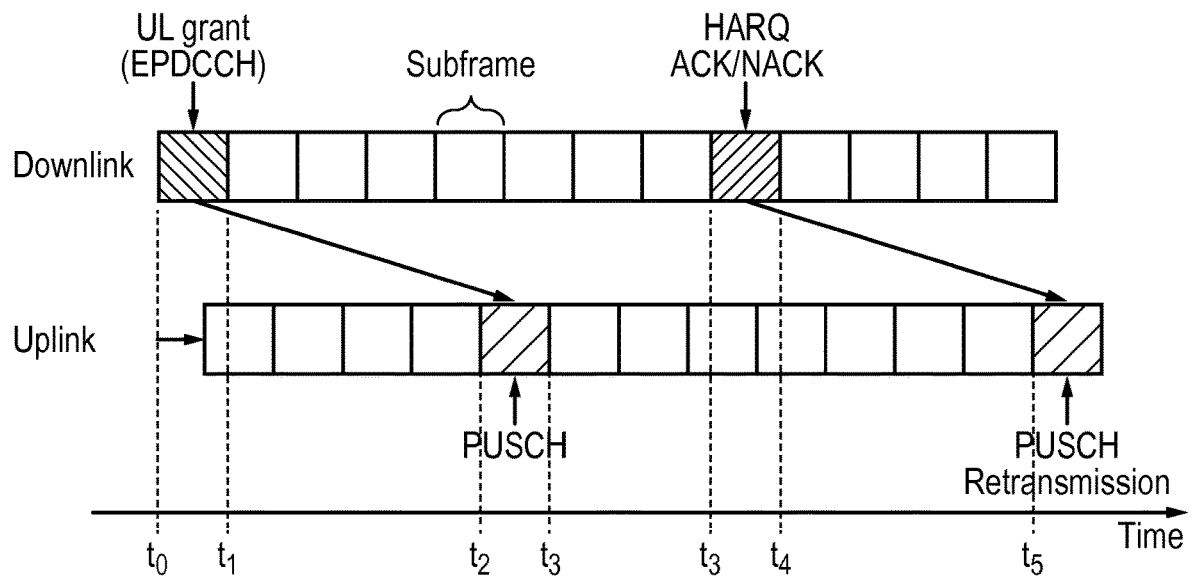
FIG. 2 illustrates an example of a conventional PUSCH/HARQ timing.

With MTC terminals, the terminals are less likely to be mobile (e.g. smart meters), although this is not a requirement, and are less likely to require low latency high-throughput communications such that limiting the capabilities of the terminals, e.g. to use narrowbands, may not be as problematic for them as it can be for conventional terminals. However, amongst the challenges faced by a narrowband terminal is the problem that the terminal can only use one narrowband at a time. In a case where a LC terminal is communicating with another mobile node, some of the existing arrangements and techniques are no longer available to the terminal. This can for example become a problem in a random access procedure, as will be apparent from the discussion of FIGS. 2 and 3 below, where FIG. 2 illustrates an example of a conventional PUSCH/HARQ timing and FIG. 3 illustrates an example call flow for a conventional RACH procedure in an example LTE environment.

In LTE, uplink traffic is transmitted using the Physical Uplink Shared Channel (PUSCH) where synchronous HARQ retransmission is used. In synchronous HARQ transmission, the time location of the PUSCH, the HARQ ACK/NACK and the subsequent PUSCH retransmission are predefined within the HARQ process. For example in FIG. 2, the terminal receives an uplink grant (containing scheduling information such as MCS and PRB) from a Downlink Control Information (DCI) carried for example by an Evolved-Physical Downlink Control Channel (EPDCCH) between time t0 and t1. The uplink grant does not however contain any time information on when the terminal should transmit the PUSCH. As predefined in the communication protocols and conventions, the terminal is expected to transmit the PUSCH signals four subframes after receiving the uplink grant, i.e. in the subframe between time t2 and t3. The terminal would then expect a HARQ ACK/NACK acknowledgement message from the base station four subframes after transmitting the PUSCH, i.e. between time t3 and t4 in FIG. 2. If there is a retransmission, for example the base station failed to receive the PUSCH correctly, it would occur 4 subframes after the reception of the HARQ ACK/NACK, i.e. in the sub-frame starting at time t5. Up to seven other HARQ processes (for a total of eight attempts) can occur after time t1 whilst this HARQ process is being performed. If the base station fails to receive the PUSCH after a maximum number of retransmissions is reached the transmission fails and the terminal and base station will effectively leave it to the upper layers to recover the data or re-attempt transmission. Accordingly, the timing of the HARQ resources is pre-defined by the resources allocated for the PUSCH transmission.

The frequency resources for sending the HARQ message are also pre-defined and can depend on whether the HARQ transmissions are in adaptive or non-adaptive mode. In the current system, the HARQ ACK/NACK messages (acknowledgement messages) can be sent using non-adaptive HARQ or adaptive HARQ where, in non-adaptive HARQ, the base station sends a Physical Hybrid-ARQ Indicator Channel (PHICH) message containing either an ACK or an NACK. If the terminal receives an NACK, it would then retransmit the PUSCH 4 subframes later using the same Modulation and Coding Scheme (MCS) and frequency resource (Physical Resource Block "PRB") as those in the initial uplink grant for the PUSCH transmission. The PHICH spans across the entire system bandwidth. If in adaptive HARQ, the base station then sends an uplink grant using a DCI carried by an EPDCCH containing the NACK as well as scheduling information indicating for example which PRB (frequency resources) to use for the PUSCH retransmission. In other words, adaptive HARQ gives the base station more scheduling flexibility in using other resources for the PUSCH retransmissions than those used for the original PUSCH transmission. The EPDCCH also spans across the entire system bandwidth.

Figure 3:
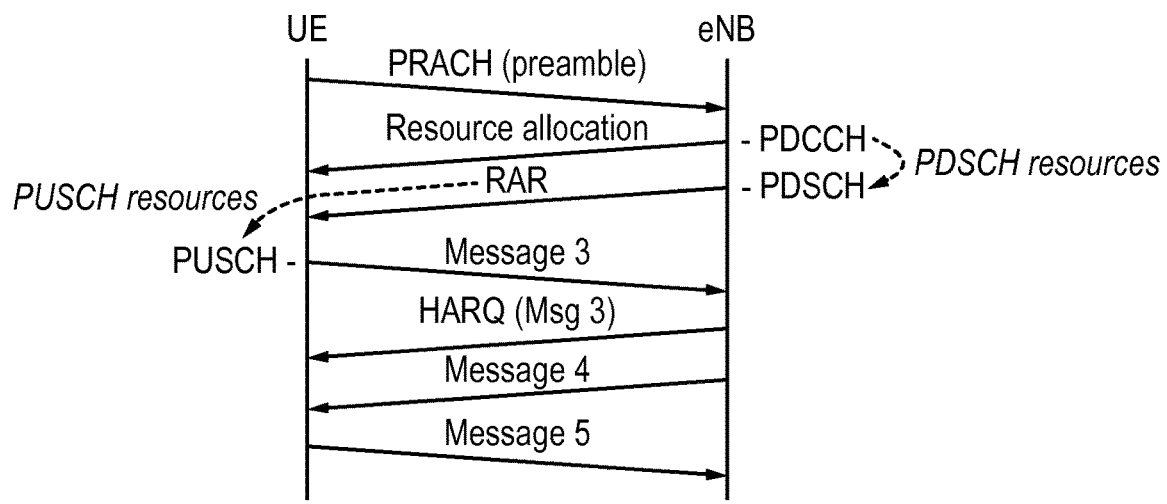
FIG. 3 illustrates an example call flow for a conventional RACH procedure.

Now turning to FIG. 3, a conventional random access procedure (sometimes referred to as a RACH or PRACH procedure) is illustrated. The terminal performs a RACH process in order to connect (or request for resource) from the network and it can either decide to start this procedure on its own or it can be prompted to do so, for example following a paging message. The terminal first sends a message on the Random Access Channel (RACH) using a preamble and the base station responds with a Random Access Response (RAR) message on the downlink which indicates the preamble that the base station is responding to and also an uplink grants (scheduling information) for the corresponding Message 3. In practice, The RAR is scheduled using the PDCCH (in Common Search Space), e.g. with a DCI message on the PDCCH (or EPDCCH if appropriate).

If the terminal's preamble is being acknowledged by the base station, the terminal will use the PUSCH resources indicated in the uplink grant (in the RAR) to transmit the Message 3, which is usually an RRC Connection Request for initiating an RRC connection. This is generally followed by Message 4 (e.g. RRC Connection Setup) in the downlink and Message 5 (e.g. RRC Connection Setup Complete) in the uplink. As Message 3 is transmitted via the PUSCH, HARQ acknowledgment and (re)transmission, if appropriate, apply to this message. However conventional HARQ method rely on the (E)PDCCH and/or on the PHICH to send the acknowledgement to the terminal. As the legacy PHICH & PDCCH occupy the entire system bandwidth, they cannot be used by terminals with limited bandwidth capabilities, e.g. Rel-13+ LC-MTC terminals which can only receive signals in 6 PRB narrowband and not from wider bands.

There have been suggestions to schedule the RAR using an MPDCCH, which is based on EPDCCH and which can be transmitted within 6 PRBs, to carry a DCI containing the scheduling information for the RAR. While the details of the transmission of the allocation of resources for the RAR message are related to the present disclosure, they are outside its scope. In contrast, the present disclosure is concerned with the transmission of an acknowledgement message for a random access procedure, in particular for the third message, on the uplink, of the random access procedure and the allocation of resources for this acknowledgement message. It should also be appreciated that Message 3 in FIG. 3 is the first PUSCH transmission from the terminal from idle mode and, at this point, terminal specific configurations are not yet available. Therefore the HARQ Resources need to be configured and selected to enable the HARQ retransmission for Message 3, if appropriate.

In one example, the resources for transmitting the acknowledgment message are based on and identifiable from at least one of the allocation message (e.g. DCI), the downlink message in response (e.g. RAR) to an uplink random access message (e.g. PRACH preamble message) and the uplink random access request/message (e.g. PRACH preamble message). For example the resources can be implicitly and/or explicitly indicated by any combination of one or more of the random access request, the allocation message and the downlink message. The acknowledgement is for an uplink message sent in response to the downlink message which itself was sent in response to the uplink random access request.

Figure 4:
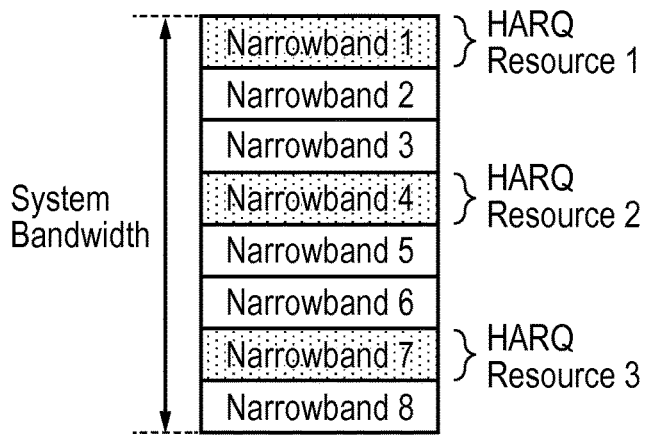
FIG. 4 is schematic illustration of a narrowband distribution.

In the following examples, it is expected that only some of the narrower bands of the system bandwidth can be used for transmitting HARQ messages, as illustrated in FIG. 4 schematic showing a narrowband distribution. However, it should be understood that the same principles apply if all of the narrower bands (hereinafter referred to as narrowband, using the current LTE terminology even though the present disclosure is not limited to narrowbands as presently defined in LTE) of the system bandwidth can be used to send HARQ acknowledgment messages or if fewer/more/different narrowbands may be used to transmit the acknowledgment messages. Also, if only some of the narrowbands, but not all, may be used for acknowledgements, the acknowledgment narrowbands can be known to the terminal (e.g. rep-defined in a standard) or may be communicated to the terminal. In one example, the resources available for HARQ retransmissions can be transmitted to the terminal via a broadcasted message, such as a System Information Block (SIB) message transmitted by a base station to its entire cell. In the following examples, it will generally be assumed that different base stations may wish to use different resources for HARQ messages such that each base station will communicate which resources will be used for HARQ messages using a SIB transmission to all terminals in its cell but the present disclosure is not limited to this example.

Figure 5:
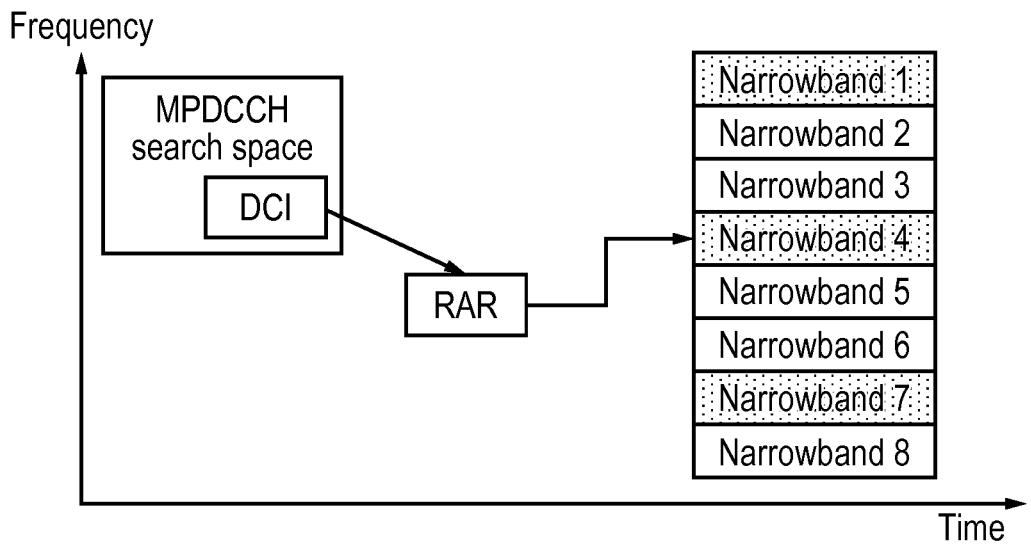
FIG. 5 illustrates an example of HARQ resource indication using a RAR message.

FIG. 5 illustrates an example of HARQ resource indication using a RAR message. In this example, the frequency resources used for sending the HARQ message for Message 3 on the PUSCH is indicated in the RAR message sent in response to the uplink random access message. For example in FIG. 5, a system bandwidth consists of eight narrowbands (each narrowband is 6 PRBs) and the SIB would configure three of these narrowbands (Narrowband 1, Narrowband 4 & Narrowband 7) as HARQ Resources. If a DCI based HARQ ACK/NACK is used, then these indicated narrowbands would be the MPDCCH Search Space and the LC-MTC terminal would monitors for this DCI in the relevant narrowband, e.g. Narrowband 4 in FIG. 5. Accordingly, the terminal can derive from the RAR message which resources will be used to transmit the HARQ message for Message 3 and can thus receive the acknowledgment message by tuning in the appropriate narrowband to receive the ACK/NACK message.

Figure 6:
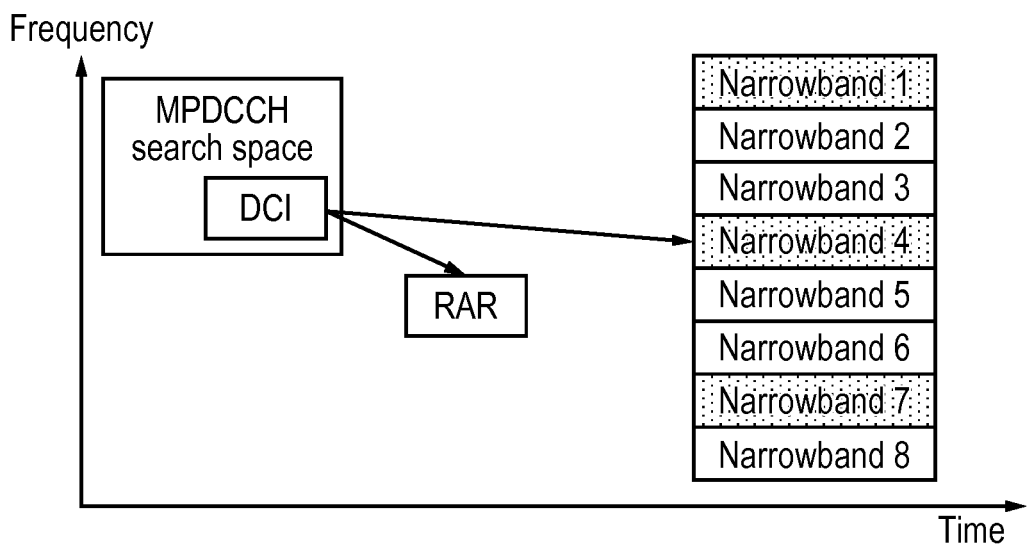
FIG. 6 illustrates an example of HARQ resource indication using a DCI message.

FIG. 6 illustrates an example of HARQ resource indication using a DCI message. This example is analogous to that discussed in respect of FIG. 5, but where the indication of downlink resources for sending the acknowledgment message is provided by the downlink allocation message (e.g. DCI) for the downlink message (e.g. RAR message). This DCI would then include information about the scheduling of the RAR message, but also of the HARQ message to be transmitted in respect of the response (Message 3) to the RAR message.

Generally, the resource indication may indicate the frequency resources where the terminal should search for the acknowledgment message and/or the timing of the resources. In one example, the indication may be for one of the narrowbands and the timing may be derived from the timing of the uplink (e.g. PUSCH) message as previously discussed while in other cases other timing arrangements may be used, as further discussed below. Also in some arrangements the indication may be an explicit one, e.g. resources allocation/scheduling information included in the RAR and/or DCI messages or may be an implicit one, as illustrated below.

While indicating the HARQ Resource in a RAR and/or DCI messages may provide more flexibility in the resources that may be used for sending the HARQ messages (thereby potentially improving resource utilisation), this would increases the size of the RAR and/or DCI messages. Although the impact of this could be limited or considered as not being significant in normal coverage, this would lead to longer repetitions in coverage enhancement operation where the DCI and RAR would be repeated. With a view to improving this, in some examples, the HARQ resources may be at least in part implicitly identifiable from any one or more of the random access request, the downlink allocation message and the corresponding downlink message (in response to the random access request).

In one example, the acknowledgment (HARQ) resources may be implicitly identifiable using a defined link between the RACH resource used for the uplink random access request and the HARQ Resource used. The link may for example be defined in the SIB and/or in the specifications. Conventionally, the RACH resource consists of a frequency, time and code (PRACH preamble) combination. Depending on the preamble selected by the terminal, the resources for the HARQ message can be identified (possibly also based on additional information if appropriate). In a case where three CE Levels are used (i.e. for total of 4 coverage levels if including normal coverage with no repetition), RACH resource can for example be defined for each CE Levels. That is, different frequency resources may be used for different CE Levels and/or different preamble codes may be used for different CE Levels. For example, is there are 64 preamble codes and if 3 HARQ Resources are defined (e.g. three narrowbands for sending HARQ messages), then the terminals may be configured such that a terminal in CE level 1 uses preamble codes 0 to 21 and the HARQ message will use HARQ Resource 1, with preamble codes 22 to 42 and HARQ Resource 2 for a terminal in CE Level 2 and with preamble codes 43 to 64 and HARQ Resource 3 for a terminal in CE Level 3. It should be appreciated that similar relationship can be defined for RACH frequency resource or combination of frequency and preamble. In some example, the time at which the random access request has been sent may also be linked to the resources to be used for the HARQ message in respect of Message 3.

In another example, the HARQ Resource is implicitly indicated by the (PDSCH) resources used for transmitting the downlink message (e.g. RAR). The RAR is scheduled by a DCI and can occupy any of the configured narrowbands and, in one example, the narrowband used can be used to indicate the HARQ Resource. For example, if consider again three HARQ Resources (HARQ Resource 1, HARQ Resource 2 & HARQ Resource 3), and the narrowband used for RAR is Narrowband 6, then the HARQ Resource can be a function of the Narrowband used for transmitting the RAR, such as:

$$\text{HARQ Resource} = (\text{Narrowband}_{RAR} \text{ MOD } 3) + 1 \quad (1)$$

That is in this illustrative example, the HARQ Resource would be HARQ Resource 1. It should be appreciated that this is MOD function is provided an illustration and that other functions or links based on the downlink (e.g. PDSCH) resource can be used. Also, in case repetition and/or frequency hopping is used for transmitting the downlink message (e.g. the RAR on the PDSCH), then the narrowband corresponding to the first repetition or the last repetition can be used to implicitly indicate the HARQ Resource, based on a convention for example. It is noteworthy that this example of implicit indication from the downlink message also corresponds to the illustration of FIG. 5, where the indication of which resource(s) to use is at least implicitly indicated rather than being explicitly indicated.

Likewise, in FIG. 6, the acknowledgement resources can be at least in part implicitly identified based on the downlink allocation message (e.g. DCI on MPDCCH used to schedule the RAR), for example based on the resources used for sending the downlink allocation message. In one example, the first Enhanced Control Channel Element (ECCE) index used in the MPDCCH is used to implicitly indicate the HARQ Resource used. Additional or other links between the time and/or frequency resources used to transmit the downlink allocation message and the resources to transmit the acknowledgment message may be used.

Figure 8:
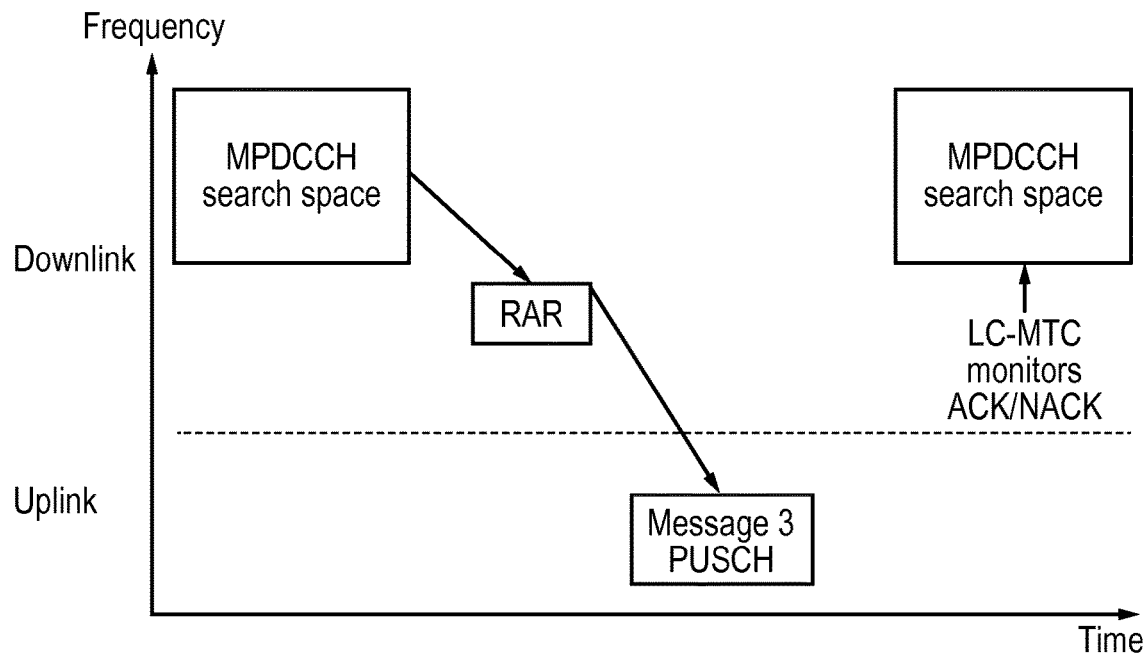
FIG. 8 illustrates an example of an indication of the HARQ resources using a DCI message.

FIG. 8 illustrates another example of an implicit indication of acknowledgment resources using a DCI message. In this example the HARQ message is carried by a DCI in an MPDCCH search space and the HARQ Resource (i.e. MPDCCH search space containing the DCI) is the same as that used to schedule the RAR. As illustrated FIG. 8, the terminal first monitors the MPDCCH search space for DCI that schedules the RAR. The RAR contains scheduling info for Message 3 (PUSCH) and after transmitting Message 3 (using PUSCH), the terminal can then monitor the same MPDCCH search space (i.e. same frequency resource and set of MPDCCH candidates) for the HARQ ACK/NACK. The timing may be determined as deemed appropriate, for example after a predetermined time (e.g. 4 subframes) after the uplink transmission of Message 3 or using any other timing determination method. It should be noted that this sharing of the same MPDCCH search space between DCI and HARQ ACK/NACK messages may cause congestion.

However, this example can offer a relatively simple approach in determining the HARQ Resource.

Figure 7:
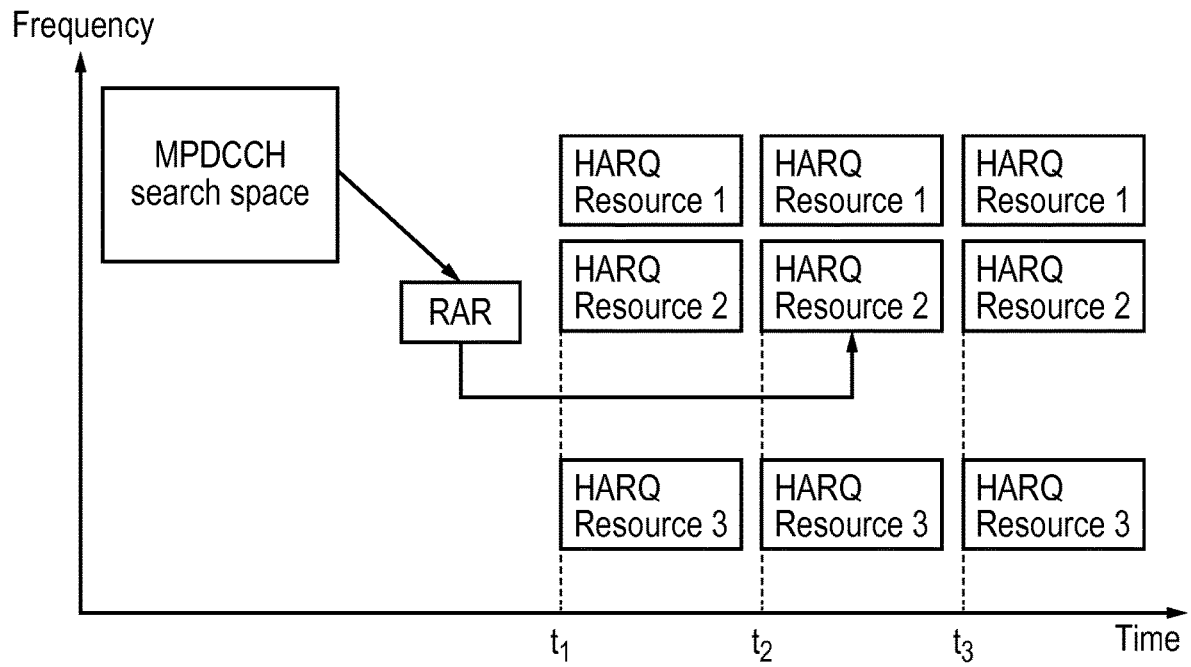
FIG. 7 illustrates an example of an indication of the timing and frequency of HARQ resources using a RAR message.

Also, while the resource indication that can be derived to identify the ACK/NACK resources as discussed above generally discuss identify the frequency band or the frequency resources where the acknowledgment message will be transmitted, an explicit or implicit indication can also provide an indication of the timing of the transmission of the acknowledgement message. In some example the timing will be automatically be selected based on the timing of the uplink message (Message 3), e.g. 4 subframes later, while in other examples other timings may be used and they may identified based at least one of the uplink random access request (PRACH message), the downlink allocation message (DCI) or the downlink message (RAR). For example, FIG. 7 illustrates an example of an indication of the timing and frequency of HARQ resources using a RAR message. In this example, the RAR also indicates a timing offset for the terminal (e.g. LC-MTC terminal) to monitor for its HARQ ACK/NACK message. This scenario recognises that for cases where there may not be enough HARQ Resources in the frequency domain, it may be useful to adjust the timing of the acknowledgment message transmissions. As a result, this embodiment allows the HARQ Resources to be spread out in time. More specifically, in the example illustrated in FIG. 7, three HARQ Resources are configured in the frequency domain. Multiple RAR can be multiplexed into a single MAC message and if there is not sufficient resource in the frequency domain, the RAR can indicate one of the HARQ Resource in time. If no offset is indicated or if a default offset is indicated, the terminal will know to monitor the indicated frequency resources for the default timing (e.g. based on the timing for the PUSCH transmissions or otherwise). In the example of FIG. 7, the RAR for a specific terminal points to HARQ Resource 2 that starts at time t2, with for example a default timing being time t1. Effectively this examples uses a time or timing indication to the HARQ Resource used for transmitting the acknowledgment message. It should be pointed out that introducing a time offset would disrupt the timeline of the PUSCH synchronous HARQ transmission as presently used however, this may be considered as acceptable in some cases, such as in Coverage Enhanced operation or repetition operation where the timeline may already be disrupted due to the repetitions of the messages.

It is also noted that the resources for sending the acknowledgment message may span multiple subframes in case repetitions is implemented and in use. A HARQ Resource can be used for a specific Coverage Level, for example HARQ Resource 1 can be used for (LC-MTC) terminals in Coverage Level 1, HARQ Resource 2 for terminals in Coverage Level 2 and HARQ Resource 3 for terminals in Coverage Level 3 in the case of three different coverage levels. Different Coverage Level would require different number of repetitions and therefore the HARQ Resources may span different numbers of sub-frames depending on the relevant number of repetitions. It should also be appreciated that more than one HARQ Resources can be configured for a single Coverage Level. In this example, the RAR could indicate an index (e.g. 2 bits) to which HARQ Resource has been used and for the terminal to monitor for HARQ ACK/NACK.

Figure 9:
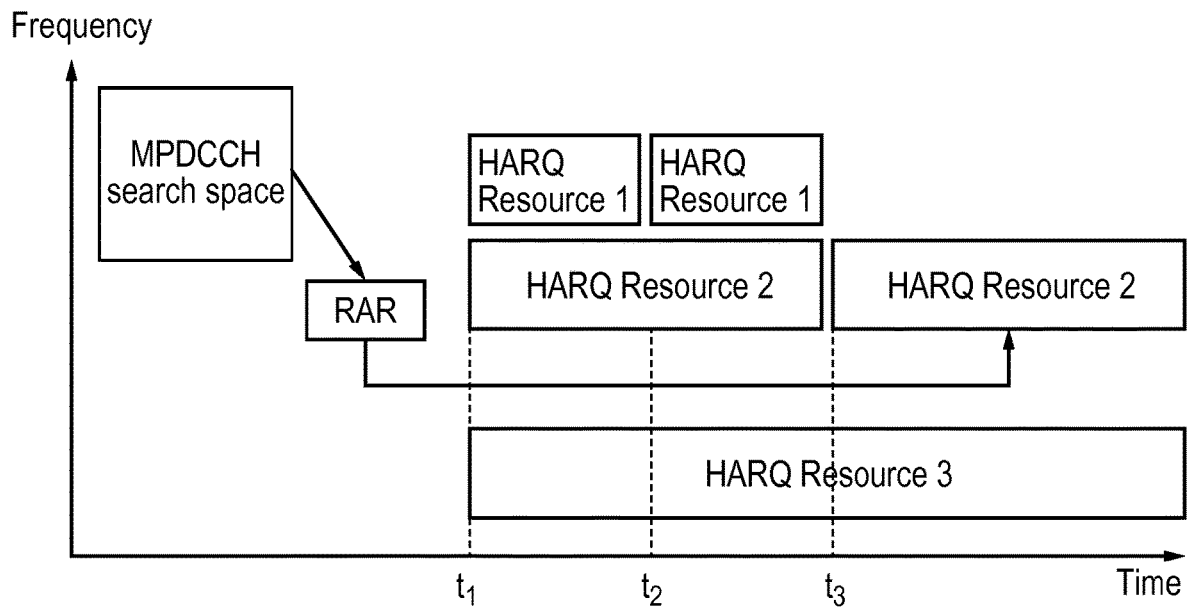
FIG. 9 illustrates an example of an indication of the timing and frequency of HARQ resources using a RAR message and a coverage level.

While implicitly indication of the acknowledgement resource, for example using a defined linkage with another resource (e.g. RACH message, RAR message on PDSCH, MPDCCH ECCE for DCI, etc.), this can impose restrictions to the base station scheduler. For example, once resources have been used that are linked to HARQ resources, the base station should generally try to ensure that the linked HARQ resources remain available in case it is needed for a HARQ transmission (if for example the random access procedure is not stopped before it is completed). This can increase the complexity of the base station and reduce its flexibility in allocating and scheduling resources for transmissions. On the other hand, explicit indication of resources can increase the size of the RAR or DCI which would also come with its limitations. Therefore, in another example, an implicit/explicit hybrid indication can be used. While any combinations of an implicit and explicit indication as discussed herein can be used, in one example the implicit indication (e.g. the RACH resource selected by the terminal) could narrow down the possible HARQ Resources that can be used (e.g. HARQ Resource 1 or 2, but not 3) whilst a reduced explicit signalling in the RAR or DCI message could indicate the precise HARQ Resource (e.g. Resource 2). For example in FIG. 9, which illustrates an example of an indication of the timing and frequency of HARQ resources using a RACH message and a RAR message, three HARQ Resources (frequency bands) are available in the frequency domain, where HARQ Resource 1 is for Coverage Enhancement Level 1, HARQ Resource 2 is for Coverage Enhancement Level 2 and HARQ Resource 3 is for Coverage Enhancement Level 3. For HARQ Resource 1 and HARQ Resource 2, they are also spread in time with a view to utilising the time resource more extensively for example. In this example, the RACH resource used by the LC-MTC terminal would implicitly indicate the Coverage Enhancement Level used and this would narrow down to a smaller possibility of HARQ Resources. For example, if the RACH resource used corresponds to Coverage Enhancement Level 2, then only 1 bit is required in the RAR to indicate whether the HARQ Resource 2 starts at time t1 or t3.

In another illustrative example, a hybrid indication of resources may rely on the RAR or DCI message indicating an offset to a reference HARQ Resource. For example, in the case where the HARQ ACK/NACK is carried by a DCI, the reference HARQ Resource can be the MPDCCH search space used to schedule the RAR (see for example the discussion in respect of FIG. 8) which would provide an implicit indication of a resource (frequency resource) used for transmitting the acknowledgment message. The RAR or DCI message can the explicitly indicate a frequency or time offset relative to this resource. For example, if MPDCCH search space scheduling the RAR is in Narrowband 5, the RAR can indicate an frequency offset +1 which would indicate that the HARQ Resource can be found at Narrowband 6.

Figure 10:
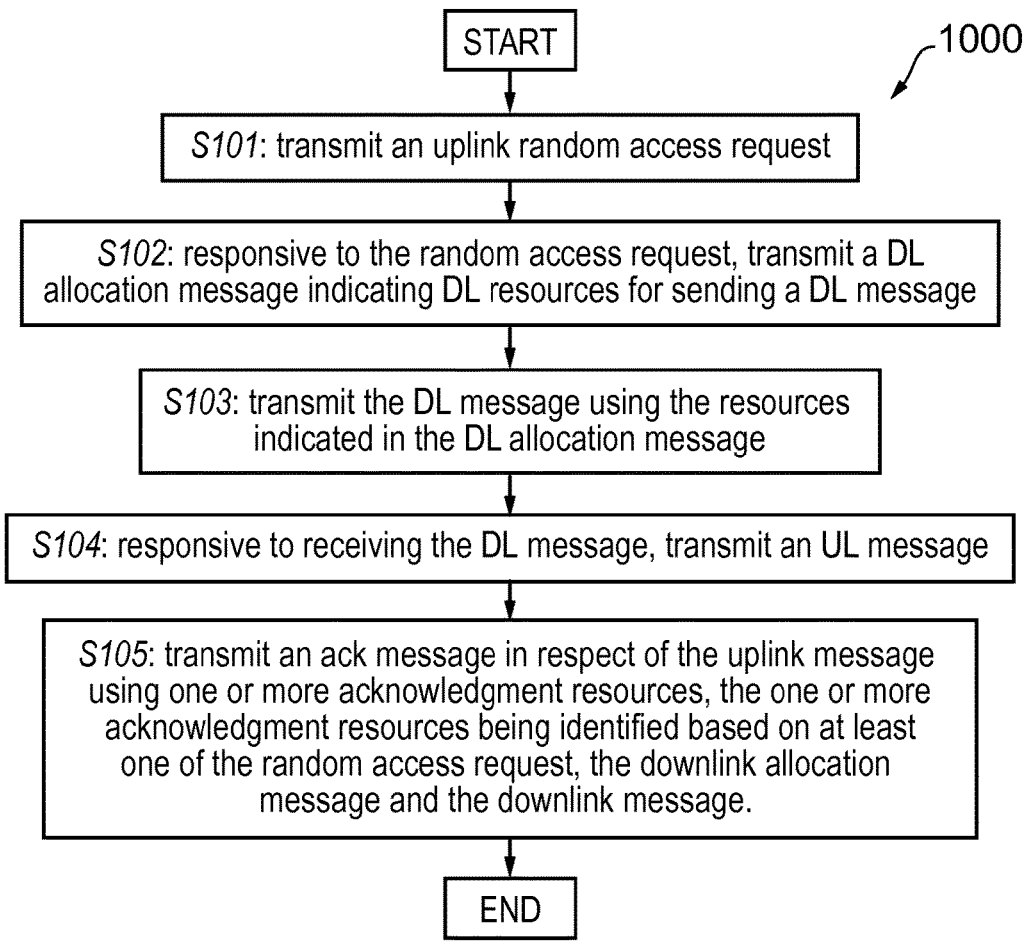
FIG. 10 illustrates an example method for transmitting an acknowledgement message in a random access procedure.

FIG. 10 illustrates an example method 1000 for transmitting an acknowledgement message in a random access procedure. The method 1000 starts and at S101 an uplink random access request is transmitted, for example by a terminal and/or on an uplink random access channel. The uplink message can for example be a message indicating a preamble and transmitted on a RACH. Then, responsive to the random access request, a Downlink (DL) allocation message is transmitted, for example by a base station, that indicates DL resources for sending a DL message. For example the DL allocation message can be a DCI carried by an MPDCCH. Then, at S103, the DL message is transmitted, for example by the base station, using the resources indicated in the DL allocation message. The DL message can for example be a RAR message carried by a PDSCH. Then at S104 and responsive to receiving the DL message, an UL message is transmitted, for example by the terminal. The UL message can correspond to the Message 3 in the RACH procedure e.g. for initiating an RRC connection. Then, an acknowledgment message in respect of the uplink message is transmitted using one or more acknowledgment resources (S105), the one or more acknowledgment resources being identified based on at least one of the uplink random access request, downlink allocation message and the downlink message. For example, they can be based using any one or more of an implicit or explicit indication from the uplink random access request, downlink allocation message or the downlink message. Accordingly, the terminal can identify which resources will be used for transmitting the acknowledgment message and can monitor these resources to determine if they contain the acknowledgement message for its uplink message. As the skilled person would have understood, in the present disclosure, when reference is made to an uplink random access request, a downlink allocation message, a downlink message or an uplink message, without more specific information, this is intended to refer to the messages as discussed with respect to FIG. 10. While method 10 can generally be carried out by a terminal and a base station, in other examples they be carried out by different elements, for example by a terminal and a relay node or by a relay node and a base station, respectively.

Figure 11:
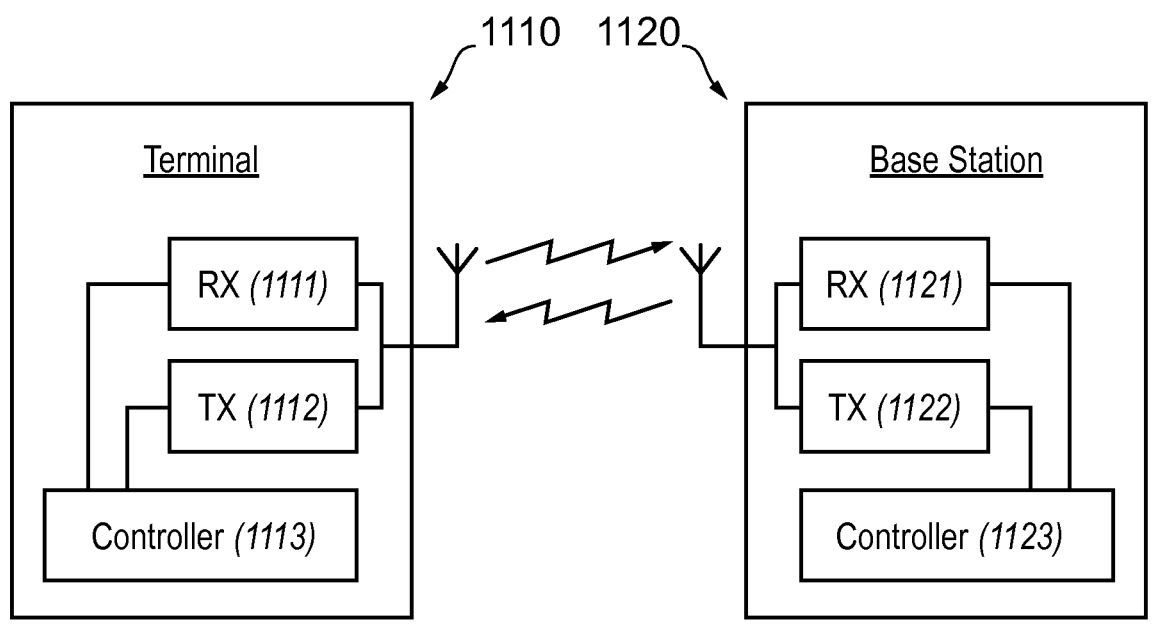
FIG. 11 illustrates an example terminal and an example base station in a telecommunications system.

FIG. 11 illustrates an example terminal and an example base station in a telecommunications system. FIG. 11 illustrates an example terminal (1110) and an example base station (1120) configured to communicate with each other and which may implement one or more techniques as discussed herein. The terminal 1110 comprises a receiver 1111 and a transmitter 1112 connected to an antenna for communicating via a wireless interface. The terminal also comprises a controller 1113 for controlling at least the receiver and transmitter of the terminal 1110. For example, the controller, receiver and transmitter may be configured to operate together to transmit, via the transmitter, an uplink random access request; to receive, via the receiver, a downlink allocation message in response to the uplink random access request and indicating downlink resources for sending a downlink message; to receive, via the receiver, the downlink message using the resources indicated in the downlink allocation message; to, responsive to receiving the downlink message, transmit an uplink message via the transmitter; and to transmit, via the transmitter, an acknowledgement message in respect of the uplink message and using one or more acknowledgment resources, wherein the one or more acknowledgment resources are identified based on at least one of the downlink allocation message and the downlink message. Likewise, the base station 1120 comprises a receiver 1121 and a transmitter 1122 connected to an antenna for communicating via a wireless interface. The base station 1120 also comprises a controller 1123 for controlling at least the receiver and transmitter of the base station 1120. For example, the controller, receiver and transmitter may be configured to operate together to receive, via the receiver, an uplink random access request; to transmit, responsive to the random access request and via the transmitter, a downlink allocation message indicating downlink resources for sending a downlink message; to transmit, via the transmitter, the downlink message using the resources indicated in the downlink allocation message; to receive, via the receiver, an uplink signal for an uplink message; and to transmit, via the transmitter, an acknowledgement message in respect of the uplink message and using one or more acknowledgment resources, wherein the one or more acknowledgment resources are identified based on at least one of the downlink allocation message and the downlink message. The base station and terminal can communicate over the air, via the wireless interface by transmitting uplink signals from the terminal to the base station and downlink signals from the base station to the terminal.

While FIG. 11 shows a schematic illustration of a terminal and of a base station, it will be appreciated that while in examples of the present disclosure, each terminal includes a transmitter, receiver and controller and each base station includes a transmitter, receiver and controller so as to allow communication between the terminals and/or base stations, the terminal and base station may be implemented using any appropriate technique. For example, the controller may comprise one or more processor units which are suitably configured/programmed to provide the desired functionality described herein using conventional programming/configuration techniques for equipment in wireless telecommunications systems. For each terminal, the transmitter, receiver and controller are schematically shown in FIG. 11 as separate elements for ease of representation. However, it will be appreciated that for each terminal the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminals will in general comprise various other elements associated with their operating functionality in accordance with established wireless telecommunications techniques (e.g. a power source, possibly a user interface, and so forth).

There has therefore been described an arrangement where an acknowledgement message can be transmitted using resources that can be identified by the recipient from any one or more previous messages in the random access procedure, from the random access request to the downlink message responding to the random access request. Accordingly, rather than use a single acknowledgement channel which could be restrictive on the use of resources, more flexibility and a potentially wider of resources may be used for transmitting this acknowledgment message while limiting the amount of resources that would be allocated exclusively to acknowledgements.

It will be understood that, although the present disclosure has been presented generally in the context of LC-MTC devices, the teachings of the present invention are not limited to this example environment and other mobile telecommunications environment may be used. For example, the HARQ ACK/NACK messages can be understood as simply being an example of an acknowledgment message, wherein the acknowledgment may be for sending positive acknowledgements only, negative acknowledgements only or both positive and negative acknowledgments (e.g. as in HARQ). Likewise, the RAR and DCI are examples of— using the terminology of the present disclosure, a downlink message (in response to a random access request) and of a downlink allocation request (for scheduling the downlink message), respectively.

Also, while the examples herein generally discuss indicating a "HARQ Resource" this should be understood as an example of one or more resources. For example, in the context of the above examples, the HARQ resource generally refers to a narrowband that may be used for transmitting acknowledgments. From a perspective, this can be view as a resource (a frequency band) and from another perspective it can be viewed as several resources (e.g. one or more— usually six—PRBs with one or more sub-frames or frames, etc.).

Also, the present disclosure is applicable to both non-adaptive HARQ and adaptive HARQ cases (or to other acknowledgment processes having an adaptive and non-adaptive mode). That is, in case of a negative acknowledgment, the negative acknowledgment may indicate resources for the uplink message retransmission or may not include any such indication and the retransmission resources may be determined based on the resources previously used for the uplink message transmission.

Additionally, in case a retransmission is required, the downlink allocation message and/or the downlink message for the negative acknowledgment can further indicate one or more further resources for the further acknowledgment message to be transmitted in response to the uplink message re-transmission. For example the DCI carrying the HARQ ACK/NACK for Message 3, can further indicate the HARQ Resource for the next Message 3 retransmission in the case of an NACK. That is, after the LC-MTC terminal transmits the first PUSCH message carrying the Message 3, it would monitor the HARQ Resource for a HARQ ACK/NACK. If a retransmission is required, the DCI would—in addition to informing the LC-MTC terminal that the acknowledgment message is for a "NACK"—also inform the LC-MTC terminal where to monitor for the HARQ ACK/NACK after it has retransmitted the PUSCH carrying the Message 3. This can provide further flexibility to the base station scheduler.

Additionally, the method steps discussed herein may be carried out in any suitable order. For example, steps may be carried out in an order which differs from an order used in the examples discussed above or from an indicative order used anywhere else for listing steps (e.g. in the claims), whenever possible or appropriate. Thus, in some cases, some steps may be carried out in a different order, or simultaneously or in the same order. So long as an order for carrying any of the steps of any method discussed herein is technically feasible, it is explicitly encompassed within the present disclosure.

As used herein, transmitting information or a message to an element may involve sending one or more messages to the element and may involve sending part of the information separately from the rest of the information. The number of "messages" involved may also vary depending on the layer or granularity considered (for example a single MAC message may correspond to a plurality of REs). Also, transmissions from one terminal to a base station may relate to the transmission of any one or more of user data, discovery information, control signalling and any other type of information to be transmitted.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system. Additionally, it is also hereby explicitly disclosed that for any teachings relating to a method or a system where it has not been clearly specified which element or elements are configured to carry out a function or a step, any suitable element or elements that can carry out the function can be configured to carry out this function or step. For example any one or more or a mobile terminal (e.g. a D2D terminal), a relay node (e.g. a terminal-to-terminal relay node), a base station or any other mobile node may be configured accordingly if appropriate, so long as it is technically feasible.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or LC-MTC, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard (e.g. the 5G standards).

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered clauses:

Clause 1. A method of transmitting an acknowledgment message in a random access procedure in a mobile telecommunications system, the method comprising:
transmitting an uplink random access request;
responsive to the random access request, transmitting a downlink allocation message indicating downlink resources for sending a downlink message;
transmitting the downlink message using the resources indicated in the downlink allocation message;
responsive to receiving the downlink message, transmitting an uplink message; and
transmitting an acknowledgement message in respect of the uplink message and using one or more acknowledgment resources, wherein the one or more acknowledgment resources are identified based on at least one of the downlink allocation message, the downlink message and the uplink random access request.

Clause 2. The method of any preceding clause wherein the downlink message allocates one or more uplink resources for the transmission of the uplink message and wherein the uplink message is transmitted using the one or more uplink resources.

Clause 3. The method of any preceding clause wherein the one or more acknowledgment resources are identified at least in part based on an acknowledgement resource indicator in the downlink allocation message.

Clause 4. The method of any preceding clause wherein the one or more acknowledgment resources are identified at least in part based on a set of one or more resources used for transmitting the downlink allocation message.

Clause 5. The method of any preceding clause wherein the one or more acknowledgment resources are identified at least in part based on an acknowledgement resource indicator in the downlink message.

Clause 6. The method of any preceding clause wherein the one or more acknowledgment resources are identified at least in part based on a set of one or more resources used for transmitting the downlink message.

Clause 7. The method of any preceding clause wherein the one or more acknowledgment resources are identified at least in part based on a set of one or more resources used for sending uplink random access request.

Clause 8. The method of any preceding clause wherein the one or more acknowledgment resources are further identified at least in part based on an indication of one or more sets of resources for sending acknowledgement messages, the indication being included in a broadcasted message.

Clause 9. The method of any preceding clause wherein the one or more acknowledgment resources are further identified at least in part based on a repetition level for the transmission of the acknowledgement message.

Clause 10. The method of any preceding clause wherein at least one of a frequency band and a timing of the one or more acknowledgment resources is identified based on at least one of the downlink allocation message and the downlink message.

Clause 11. The method of any preceding clause wherein, in the event that the acknowledgement message is for a negative acknowledgement, the acknowledgement message comprises a negative acknowledgment without scheduling information for the uplink message retransmission or a negative acknowledgement with scheduling information for the uplink message retransmission.

Clause 12. The method of any preceding clause wherein:
the downlink allocation message is a Downlink Control Information "DCI" message; and/or
the downlink message is a Random Access Response "RAR" message; and/or
the uplink message is for transmitting a Radio Resource Control "RRC" message for initiating a connection.

Clause 13. The method of any preceding clause wherein the acknowledgment message is for indicating one of a positive acknowledgment or a negative acknowledgment and of a positive acknowledgment only.

Clause 14. A mobile telecommunications system for transmitting an acknowledgment message in a random access procedure, the mobile telecommunications system comprising a mobile node and a terminal and being configured to:
transmit an uplink random access request from the terminal to the mobile node;
responsive to the random access request, transmit from the mobile node to the terminal a downlink allocation message indicating downlink resources for sending a downlink message;
transmitting from the mobile node to the terminal the downlink message using the resources indicated in the downlink allocation message;
responsive to receiving the downlink message, transmit an uplink message from the terminal to the mobile node; and
transmitting from the mobile node to the terminal an acknowledgement message in respect of the uplink message and using one or more acknowledgment resources, wherein the one or more acknowledgment resources are identified based on at least one of the downlink allocation message, the downlink message and the uplink random access request.

Clause 15. A method of operating a terminal for receiving an acknowledgement message in a random access procedure in a mobile telecommunications system, the method comprising:
transmitting an uplink random access request;
receiving a downlink allocation message in response to the uplink random access request and indicating downlink resources for sending a downlink message;
receiving the downlink message using the resources indicated in the downlink allocation message;
responsive to receiving the downlink message, transmitting an uplink message via the transmitter; and
receiving, via the receiver, an acknowledgement message in respect of the uplink message and using one or more acknowledgment resources, wherein the one or more acknowledgment resources are identified based on at least one of the downlink allocation message and the downlink message.

Clause 16. A terminal for receiving an acknowledgement message in a random access procedure in a mobile telecommunications system, the terminal comprising a transmitter, a receiver and a controller, the controller being configured to:
transmit, via the transmitter, an uplink random access request;
receive, via the receiver, a downlink allocation message in response to the uplink random access request and indicating downlink resources for sending a downlink message;
receive, via the receiver, the downlink message using the resources indicated in the downlink allocation message;
responsive to receiving the downlink message, transmit an uplink message via the transmitter; and
receive, via the receiver, an acknowledgement message in respect of the uplink message and using one or more acknowledgment resources, wherein the one or more acknowledgment resources are identified based on at least one of the downlink allocation message and the downlink message.

Clause 17. The terminal of clause 16 wherein the controller is configure to identify, based on at least one of the received downlink allocation message and the received downlink message, the one or more acknowledgment resources.

Clause 18. The terminal of clause 16 or 17 wherein the receiver is configured to receive signals from a first frequency band and to receive, at any point in time, signals in a second frequency band with a bandwidth that does not exceed a bandwidth threshold, wherein the second frequency band is within the first frequency band and wherein the bandwidth of the first frequency band exceeds the bandwidth threshold.

Clause 19. Integrated circuitry for a terminal for receiving an acknowledgement message in a random access procedure in a mobile telecommunications system, wherein the integrated circuitry comprises a controller element and a transceiver element configured to operate together to:
transmit, via the transceiver element, an uplink random access request;
receive, via the transceiver element, a downlink allocation message in response to the uplink random access request and indicating downlink resources for sending a downlink message;
receive, via the transceiver element, the downlink message using the resources indicated in the downlink allocation message;
responsive to receiving the downlink message, transmit an uplink message via the transceiver element; and
receive, via the transceiver element, an acknowledgement message in respect of the uplink message and using one or more acknowledgment resources, wherein the one or more acknowledgment resources are identified based on at least one of the downlink allocation message and the downlink message.

Clause 20. A method of operating a mobile node for transmitting an acknowledgement message in a random access procedure in a mobile telecommunications system, the method comprising:

receiving, via the receiver, an uplink random access request transmit, responsive to the random access request and via the transmitter, a downlink allocation message indicating downlink resources for sending a downlink message;

transmit, via the transmitter, the downlink message using the resources indicated in the downlink allocation message;

receive, via the receiver, an uplink signal for an uplink message; and transmit, via the transmitter, an acknowledgement message in respect of the uplink message and using one or more acknowledgment resources, wherein the one or more acknowledgment resources are identified based on at least one of the downlink allocation message and the downlink message.

Clause 21. A mobile node for transmitting an acknowledgement message in a random access procedure in a mobile telecommunications system, the mobile node comprising a transmitter, a receiver and a controller, the controller being configured to:

receive, via the receiver, an uplink random access request transmit, responsive to the random access request and via the transmitter, a downlink allocation message indicating downlink resources for sending a downlink message;

transmit, via the transmitter, the downlink message using the resources indicated in the downlink allocation message;

receive, via the receiver, an uplink signal for an uplink message; and transmit, via the transmitter, an acknowledgement message in respect of the uplink message and using one or more acknowledgment resources, wherein the one or more acknowledgment resources are identified based on at least one of the downlink allocation message and the downlink message.

Clause 22. Integrated circuitry for a mobile node for transmitting an acknowledgement message in a random access procedure in a mobile telecommunications system, wherein the integrated circuitry comprises a controller element and a transceiver element configured to operate together to:

receive, via the transceiver element, an uplink random access request transmit, responsive to the random access request and via the transceiver element, a downlink allocation message indicating downlink resources for sending a downlink message;

transmit, via the transceiver element, the downlink message using the resources indicated in the downlink allocation message;

receive, via the transceiver element, an uplink signal for an uplink message; and transmit, via the transceiver element, an acknowledgement message in respect of the uplink message and using one or more acknowledgment resources, wherein the one or more acknowledgment resources are identified based on at least one of the downlink allocation message and the downlink message.

Clause 23. Computer software which, when executed by a computer, causes the computer to perform the method of any one of clauses 1 to 13, 15 and 20.

Clause 24. A storage medium which stores computer software according to clause 23.

Clause 25. A method of transmitting an acknowledgment message, a mobile telecommunications system for transmitting an acknowledgment message, a method of operating a terminal for receiving an acknowledgement message, a terminal for receiving an acknowledgement message, integrated circuitry for a terminal for receiving an acknowledgement message, a method of operating a mobile node for transmitting an acknowledgement message, a mobile node for transmitting an acknowledgement message, integrated circuitry for a mobile node for transmitting an acknowledgement message, Computer software and/or a storage medium substantially as hereinbefore described with reference to the accompanying drawings.

Clause 26. Any preceding clause wherein the base station and the mobile communications devices are operable to communicate via the wireless interface using at least one of: a 3GPP communication protocol, an LTE communication protocol, a 4G communication protocol and a 5G communication protocol.

REFERENCES

[1] 3GPP TS 22.368 version 13.1.0 Release 13 (2014-12)
[2] Holma H. and Toskala A., "LTE for UMTS OFDMA and SC-FDMA based radio access", John Wiley and Sons, 2009

The invention claimed is:

1. A method of transmitting an acknowledgment message in a random access procedure in a mobile telecommunications system, the method comprising:
   transmitting an uplink random access request;
   responsive to the random access request, transmitting a downlink allocation message indicating downlink resources for sending a downlink message;
   transmitting the downlink message using the resources indicated in the downlink allocation message;
   responsive to receiving the downlink message, transmitting an uplink message; and
   transmitting an acknowledgment message in respect of the uplink message and using one or more acknowledgment resources, wherein the one or more acknowledgment resources are identified based on at least one of the downlink allocation message, the downlink message and the uplink random access request, wherein the one or more acknowledgment resources are first implicitly identified to reduce the possible acknowledgment resources that can be used and subsequently a reduced explicit signaling indicates a precise acknowledgment resource from the implicitly identified acknowledgment resources.

2. The method of claim 1 wherein the downlink message allocates one or more uplink resources for the transmission of the uplink message and wherein the uplink message is transmitted using the one or more uplink resources.

3. The method of claim 1 wherein the one or more acknowledgment resources are identified at least in part based on an acknowledgment resource indicator in the downlink allocation message.

4. The method of claim 1 wherein the one or more acknowledgment resources are identified at least in part based on a set of one or more resources used for transmitting the downlink allocation message.

5. The method of claim 1 wherein the one or more acknowledgment resources are identified at least in part based on an acknowledgment resource indicator in the downlink message.

6. The method of claim 1 wherein the one or more acknowledgment resources are identified at least in part based on a set of one or more resources used for transmitting the downlink message.

7. The method of claim 1 wherein the one or more acknowledgment resources are identified at least in part based on a set of one or more resources used for sending uplink random access request.

8. The method of claim 1 wherein the one or more acknowledgment resources are further identified at least in part based on an indication of one or more sets of resources for sending acknowledgment messages, the indication being included in a broadcasted message.

9. The method of claim 1 wherein the one or more acknowledgment resources are further identified at least in part based on a repetition level for the transmission of the acknowledgment message.

10. The method of claim 1 wherein at least one of a frequency band and a timing of the one or more acknowledgment resources is identified based on at least one of the downlink allocation message and the downlink message.

11. The method of claim 1 wherein, in the event that the acknowledgment message is for a negative acknowledgment, the acknowledgment message comprises
a negative acknowledgment without scheduling information for the uplink message retransmission or
a negative acknowledgment with scheduling information for the uplink message retransmission.

12. The method of claim 1 wherein:
the downlink allocation message is a Downlink Control Information "DCI" message; and/or
the downlink message is a Random Access Response "RAR" message; and/or
the uplink message is for transmitting a Radio Resource Control "RRC" message for initiating a connection.

13. The method of claim 1 wherein the acknowledgment message is for indicating one of a positive acknowledgment only, a negative acknowledgment only, or both a positive acknowledgment and negative acknowledgment.

14. A method of operating a terminal for receiving an acknowledgment message in a random access procedure in a mobile telecommunications system, the method comprising:
transmitting an uplink random access request;
receiving a downlink allocation message in response to the uplink random access request and indicating downlink resources for sending a downlink message;
receiving the downlink message using the resources indicated in the downlink allocation message;
responsive to receiving the downlink message, transmitting an uplink message via the transmitter; and
receiving, via the receiver, an acknowledgment message in respect of the uplink message and using one or more acknowledgment resources, wherein the one or more acknowledgment resources are identified based on at least one of the downlink allocation message and the downlink message, wherein the one or more acknowledgment resources are first implicitly identified to reduce the possible acknowledgment resources that can be used and subsequently a reduced explicit signaling indicates a precise acknowledgment resource from the implicitly identified acknowledgment resources.

15. A terminal for receiving an acknowledgment message in a random access procedure in a mobile telecommunications system, the terminal comprising a transmitter, a receiver and a controller, the controller being configured to:
transmit, via the transmitter, an uplink random access request;
receive, via the receiver, a downlink allocation message in response to the uplink random access request and indicating downlink resources for sending a downlink message;
receive, via the receiver, the downlink message using the resources indicated in the downlink allocation message;
responsive to receiving the downlink message, transmit an uplink message via the transmitter; and
receive, via the receiver, an acknowledgment message in respect of the uplink message and using one or more acknowledgment resources, wherein the one or more acknowledgment resources are identified based on at least one of the downlink allocation message and the downlink message, wherein the one or more acknowledgment resources are first implicitly identified to reduce the possible acknowledgment resources that can be used and subsequently a reduced explicit signaling indicates a precise acknowledgment resource from the implicitly identified acknowledgment resources.

16. The terminal of claim 15 wherein the controller is configure to identify, based on at least one of the received downlink allocation message and the received downlink message, the one or more acknowledgment resources.

17. The terminal of claim 15 wherein the receiver is configured to receive signals from a first frequency band and to receive, at any point in time, signals in a second frequency band with a bandwidth that does not exceed a bandwidth threshold, wherein the second frequency band is within the first frequency hand and wherein the bandwidth of the first frequency band exceeds the bandwidth threshold.

* * * * *